Patented Aug. 24, 1937

2,090,828

UNITED STATES PATENT OFFICE 2,090,828

PROCESS FOR PURIFYING SULPHUR DIOXIDE BEARING GASES

John W. Beckman, Oakland, Calif.

No Drawing. Application June 25, 1932,
Serial No. 619,277

1 Claim. (Cl. 23—2)

This is a continuation in part of my application Serial No. 379,994, July 22, 1929.

This invention is concerned with the purification of gases such as are created in industry and in which sulphur is present as sulphur dioxide. The discharge of sulphur dioxide into the atmosphere causes much damage to property and life and has been the subject of much litigation. While many processes have been proposed for reduction of the sulphur dioxide to elemental sulphur, as will presently appear, industrially none of these have been successful, probably because they accomplished nought but to convert some of the sulphur from the form of $SO_2$ into $H_2S$, a material whose presence in the atmosphere is almost as objectionable as that of $SO_2$. The production of $H_2S$ is obviated upon reducing $SO_2$ in accordance with this invention and with the type reaction:

Eq. 1. $SO_2 + 2CO \rightarrow 2CO_2 + S$

Production of elemental sulphur by the reduction of sulphur dioxide has previously been proposed by Smith—U. S. Patent 878,569 and by Lamoreaux—U. S. Patent 1,182,915. However, these proposals, and numerous others, have never been adopted to any extent by industries exhausting sulphur dioxide to the atmosphere as ore roasters. While definite reasons for this cannot, obviously, be given, it is believed to depend on the fact that the type reaction does not proceed as simply as it might to produce elemental sulphur and because it is accompanied by others, possibly the following which create hydrogen sulphide and other materials:

Eq. 2. $SO_2 + 3H_2 \rightarrow 2H_2O + H_2S$
Eq. 3. $3S_2 + 4H_2O \rightarrow 4H_2S + 2SO_2$
Eq. 4. $SO_2 + 3CO \rightarrow COS + 2CO_2$
Eq. 5. $2COS \rightarrow CO_2 + CS_2$
Eq. 6. $3S + 4H_2O \rightarrow 4H_2S + 2SO_2$ If the final exit gas is contaminated with hydrogen sulphide, a problem is presented which is almost as serious, if not as serious, as with the original gas. That these reactions occur with that in Equation 1 is recognized for Benner in U. S. Patent 1,741,551 has suggested the reaction of the resulting hydrogen sulphide with a special catalyst at a temperature below about 200° C. But heretofore, as far as I am aware, it has not been realized and pointed out that, by controlling the chemical nature of the reducing gas, its physical condition, the quantities reacted and the temperature, the formation of hydrogen sulphide, and other sulphur compounds, upon reduction of sulphur dioxide, could be prevented or minimized. Thus, gases from sources as coal containing sulphur compounds have been proposed as suitable reducing agents along with other gases possibly free of sulphur compounds without discriminating between the utility of the gases and the great difference in final results.

While hydrogen sulphide and sulphur dioxide react $2H_2S + SO_2 \rightarrow 2H_2O + 3S$ the rate is very low particularly at those temperatures favorable to Equation 1. In fact the lower the temperature, the more satisfactory does the rate of the above reaction become, although it is not rapid and high pressure and violent agitation is depended upon by Bacon in U. S. Patent 1,807,-583 to secure results. Once hydrogen sulphide is formed upon reduction of the sulphur dioxide, its elimination is comparatively difficult as it is not easily oxidized.

I have found that it is possible to reduce sulphur dioxide substantially completely to elemental sulphur without having substantially any hydrogen sulphide in the exit gas so that, in effect, the type reaction (Equation 1) is followed and goes completely to the right. This eliminates any problem as to handling the hydrogen sulphide or other sulphides, as COS and $CS_2$ and substantially the only treatment required for the exit gas is to remove the elemental sulphur from the gas stream.

In accordance with my invention the reducing gas or atmosphere is free of sulphur or sulphur products, particularly hydrogen sulphide. Thus, sulphur free carbon monoxide, hydrogen, methane, ethane, natural gas, vaporized hydrocarbons, and other reducing fluids free of sulphur in elemental or combined form can be used successfully. The term "non-sulphur bearing" is used to refer to such reducing materials. The reducing gas is intermixed with the sulphur dioxide or sulphur dioxide carrying gas and reacted at a temperature below that at which other side reactions with sulphur occur to any appreciable extent. I have found 600° C. generally satisfactory although some latitude is possible as will be indicated later. The reacting gases are substantially dry and free of water to avoid reactions of the type of Equation 3, while the more stable forms of hydrocarbons not subject to decomposition at the temperature and pressure used to give hydrogen are preferred since the possibility for the reaction in Equation 2, to occur is minimized and control is easier.

The sulphur dioxide gas can be in diluted form —mixed with nitrogen and other gas as when drawn from a sulphide ore roasting furnace. It can be concentrated by any of the well known means as by absorption in water so as to rid it of other gases, the water being heated, all as disclosed in British Patent No. 6,404 of 1885, to liberate the sulphur dioxide. Concentration of the sulphur dioxide is preferred since less gas has to be handled and it is possible to rid the sulphur dioxide of hydrogen sulphide and moisture before reducing it to secure elemental sulphur.

The reducing gas is freed of water or moisture by cooling and condensing out the water or by the use of a desiccant. The reducing gas, if not initially free, can be rid of sulphur by any of the known processes. Thus, a hydrogen sulphide contaminated natural gas can be purified by scrubbing with a sodium carbonate—bicarbonate solution, the sulphur from the hydrogen sulphide being liberated in elemental form and the solution renewed upon blowing it with air in the presence of NiS or CoS as a catalyst. The particular details of freeing the reducing gas of sulphur or moisture form no part of this invention and any known practises can be used to practise these steps.

In practising the invention I have used substantially sulphur free, dry CO, passing two parts of the gas to one of $SO_2$ through a chamber filled with shredded asbestos, broken porous brick, glass sand or lump lime or other catalytic material. The gas mixture in contact with the asbestos or other material was kept at a temperature of about 400° C. I have found temperatures between 350° C. and 850° C. best; as a rule as the temperature is raised the conversion efficiency and production of sulphur falls off and the reactions shown by Equations 2 to 6 inclusive take place, particularly approaching and beyond 700° C. The range between 400° C. and 700° C. is, I have found, most satisfactory and maximum conversions took place between these temperatures at about 600° C. After passing over the shredded asbestos, or other material, the mixture was treated to precipitate the elemental sulphur as by settling, precipitation and filtration.

In another process successfully conducted I passed a mixture consisting of substantially sulphur free, water free natural gas and sulphur dioxide in a volume relationship of one to two over shredded asbestos maintained at about 400°–500° C. A dense cloud of yellow sulphur was emitted from the heated chamber containing the asbestos. Silica glass sand (99.6% $SiO_2$) gave the same result although this catalyst operated better with the chamber at the higher temperature of 520° C. Diatomaceous earth (crushed Sil-O-Cel, having a fineness of from a quarter inch mesh down, and a composition of 92% $SiO_2$, 0.6% CaO, 0.7% MgO, 3% $Al_2O_3$), gave successful results also at a temperature of 400° C. The natural gas used was almost all methane, dry and substantially sulphur free.

Eq. 7. $CH_4 + 2SO_2 \rightarrow 2S + 2H_2O + CO_2$
Eq. 8. $CH_4 + 3SO_2 \rightarrow 3S + 4H_2O + 2CO$
Eq. 9. $2CH_4 + SO_2 \rightarrow S + 2CO + 4H_2$ The material with which the gas mixture is contacted is a catalyst since it remains unchanged and is present in its original form after the reaction is over. It is to be noted that the catalytic materials disclosed, broken brick, shredded asbestos, diatomaceous earth, silica glass sand, asbestos and silica gel, are all of a very porous lump lime and silica gel, are all of a very porous nature having a large surface per unit volume and to some extent refractory. Thus, silica gel, it is estimated, has an area of an acre for each cubic inch of material. Since it is the surface effect of the materials that has the effect, the chemical constituency of the materials does not enter in as far as the catalysis is concerned. Thus these materials are inert with respect to the sulphur dioxide and reducing fluids employed, and they do not enter into combination with the sulphur to form sulphides or sulfites. It has been previously disclosed in Bulletin 84 of the Bureau of Mines, Metallurgical Smoke, page 72 et seq. that sulphides of barium and calcium are reversion reagents useful for the reduction of sulphur dioxide at temperatures above 750° C. See also Young Patent 1,094,767. However, I have found lump lime of a porous nature to be a surface catalyst also at a lower temperature than that mentioned by Young and that between 400–600° C. $H_2S$ formation does not occur although it will if the temperature is raised to 700° C. and higher as Young teaches. This use of porous lime is to be distinguished from that use of calcium sulphide or uses of lime under conditions where the lime is immediately converted to the known reversible sulphides. Under the conditions of my process, lime is useful by reason of its porosity and surface effect as are the other materials.

The proportion of sulphur dioxide to reducing gas should be controlled so that the minimum, if any, of any undesirable reaction products is formed. The proper proportions can be determined from a consideration of the equations of the reaction with sulphur dioxide for the particular reducing gas used. Too much of the reducing fluid may result in too large a formation of water or other undesirable so that side reactions can occur and create unwished for hydrogen sulphide or other products.

The preferred conditions include the use of a dry and "non-sulphur bearing" reducing gas and sulphur dioxide gas freed of moisture and other sulphur compounds. Under these conditions the conversion is practically complete. Of course, non-observance of any one of these conditions results in a lower efficiency, approximately in proportion to the lack of observance of the desired conditions. In practise I have reduced sulphur dioxide so rapidly that hydrogen sulphide was substantially absent from the exit gas while practically 100% of the sulphur dioxide was reduced to free, recoverable sulphur. I find that the temperature has much to do with $H_2S$ formation and that temperatures between 400° and 600° C. were the most satisfactory, and practically quantitative yields of sulphur have been secured at 400° C. or close thereto.

By the term "non-sulphur bearing" I do not wish to exclude such gases as CO, $CH_4$, $H_2$, natural gas, etc., which contain an impurity of sulphur as $H_2S$. The absence of sulphur impurities from both the reducing gas and the $SO_2$, as well as the absence of moisture, is desirable but is not an absolute essential. The most essential things are (1) observation of the temperature and keeping it at a point where $H_2S$ formation is a minimum and (2) use of non-sulphurous reducing gas as CO or $H_2$. The other factors I have mentioned are not essential absolutely to secure good results and I have operated successfully without paying any attention to them.

I claim:

A purification process for eliminating sulphur from a gas containing sulphur substantially only in the form of sulphur dioxide so that after said sulphur has been removed said gas can be passed into the atmosphere, the process comprising passing into contact with a porous lime at a temperature of about 400° C. a substantially dry gas containing sulphur substantially only in the form of sulphur dioxide and a reducing agent for the sulphur dioxide whereby said sulphur dioxide is reduced to elemental sulphur and the gas remaining is free substantially of sulphur in any form except said elemental sulphur, then removing said elemental sulphur from said remaining gas, and then releasing said remaining gas to the atmosphere.

JOHN W. BECKMAN.